US009550530B2

United States Patent
Kawaguchi

(10) Patent No.: US 9,550,530 B2
(45) Date of Patent: Jan. 24, 2017

(54) VEHICLE BODY STRUCTURE

(71) Applicant: MITSUBISHI JIDOSHA KOGYO KABUSHIKI KAISHA, Tokyo (JP)

(72) Inventor: Taichi Kawaguchi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/862,614

(22) Filed: Sep. 23, 2015

(65) Prior Publication Data

US 2016/0083011 A1     Mar. 24, 2016

(30) Foreign Application Priority Data

Sep. 24, 2014  (JP) ................................. 2014-194384

(51) Int. Cl.
| | | |
|---|---|---|
| B62D 25/20 | (2006.01) | |
| B62D 21/02 | (2006.01) | |
| B62D 21/08 | (2006.01) | |
| B62D 21/15 | (2006.01) | |
| B62D 25/08 | (2006.01) | |

(52) U.S. Cl.
CPC .............. *B62D 21/02* (2013.01); *B62D 21/08* (2013.01); *B62D 21/152* (2013.01); *B62D 25/087* (2013.01); *B62D 25/2027* (2013.01)

(58) Field of Classification Search
CPC ........................... B62D 25/2027; B62D 21/08
USPC ............ 296/187.09, 187.17, 193.07, 193.08, 204,296/203.04, 187.11
See application file for complete search history.

(56) References Cited

U.S. PATENT DOCUMENTS

| 8,820,823 B1* | 9/2014 | Shafer .................. B62D 25/20 296/193.07 |
|---|---|---|
| 2005/0077756 A1 | 4/2005 | Matsuda |
| 2007/0096508 A1* | 5/2007 | Rocheblave ......... B62D 21/152 296/193.07 |
| 2012/0306238 A1* | 12/2012 | Midoun .................. B60R 11/00 296/204 |
| 2016/0052556 A1* | 2/2016 | Kano ..................... B62D 21/11 296/187.08 |

FOREIGN PATENT DOCUMENTS

| JP | 9-118252 A | 5/1997 |
|---|---|---|
| JP | 2003-95141 A | 4/2003 |
| JP | 2010-196257 A | 9/2010 |
| JP | 4571340 B2 | 10/2010 |

* cited by examiner

*Primary Examiner* — Jason S Morrow
(74) *Attorney, Agent, or Firm* — Birch, Stewart, Kolasch & Birch, LLP

(57) ABSTRACT

A vehicle body structure includes a pair of side members, first and second cross members, a center member and a pair of connecting members. The first cross member extends in a widthwise direction and connects the side members each other. The center member is extends from a central portion of the first cross member in the widthwise direction to the front in a front-to-rear direction. The connecting members extend in the front-to-rear direction at a rear side of the first cross member and are connected to the center member at front ends thereof. Rear ends of the connecting members extend outwards in the widthwise direction towards the side members and are connected to the side members. The second cross member extends in the widthwise direction at the rear side of the first cross member and connects the connecting members each other.

5 Claims, 5 Drawing Sheets

VEHICLE BODY STRUCTURE

BACKGROUND

The present invention relates to a vehicle body structure of a rear part of a vehicle.

A vehicle body structure of a rear part of a vehicle is formed into a ladder configuration in which left and right side members are extended in a front-to-rear direction of a vehicle body and cross members are then extended between the side members. A kick-up floor portion which is raised in height in a step-like fashion is formed at a rear side of a vehicle body frame. Additionally, the side members are also formed so as to be raised in height in a step-like fashion to follow the kick-up floor portion.

Incidentally, on many occasions, a rear seat is disposed at the kick-up floor portion at the rear part of the vehicle for provision of a seating space for passengers. It is also currently adopted practice to dispose a fuel tank underneath the kick-up floor portion on many occasions. Due to this configuration, the kick-up floor portion needs to be restricted from being deformed to secure the passenger space and protect the fuel tank when the vehicle is involved in a rear collision. It is considered that the side members are reinforced to restrict the deformation of the kick-up floor portion.

Although it is considered that the rigidity of material of the side members is enhanced or reinforcement members are added to reinforce the side members, this will call for an increase in weight of the vehicle. In addition, since the side members are raised in height at the kick-up floor portion, loadings from the rear part produce a bending moment at step portions of the side members, and therefore, the amount of reinforcement at the step portions needs to be increased, and this leads to a problem that a further increase in weight will be called for.

Then, in order to reduce loadings applied to the vehicle when the vehicle is involved in a rear collision, the structure has conventionally been proposed in which a skeletal member extending to the front of a vehicle is disposed at a central portion of the vehicle and side members and the skeletal member are connected together by a frame, so that loadings applied to the side members from the rear are dispersed to the skeletal member (refer to Patent Literature 1). In the structure disclosed in Patent Literature 1, the impact loadings applied from the rear can be dispersed to the whole of the vehicle.

In the technique disclosed in Patent Literature 1, however, since part of the loadings applied to the side members from the rear is received by the frame and the rigidity of the skeletal member, the loading bearing reduction effect is limited, in reality, the loading bearing reduction effect does not match the increase in weight as a result of the addition of the frame and the skeletal member.

[Patent Literature 1] Japanese Patent No. 4571340

SUMMARY

According to the present invention, in the vehicle body structure, the increase in weight of the structure can be restricted to the smallest level without enhancing the rigidity of the material of the side members or adding reinforcement members, and the loadings from the rear can accurately be dispersed.

According to one advantageous effect of the present invention, there is provided a vehicle body structure comprising:

a pair of side members which are disposed at side portions of a vehicle body and extend in a front-to-rear direction of the vehicle body;

a first cross member which extends in a widthwise direction of the vehicle body and connects the pair of side members each other;

a center member which is extends from a central portion of the first cross member in the widthwise direction to the front in the front-to-rear direction;

a pair of connecting members which extend in the front-to-rear direction at a rear side of the first cross member in the front-to-rear direction, which are connected to the center member at front ends thereof and of which rear ends extend outwards in the widthwise direction towards the side members and are connected to the side members; and a second cross member which extends in the widthwise direction at the rear side of the first cross member in the front-to-rear direction and connects the pair of connecting members each other.

Both end portions of the second cross member may be connected individually to the side members.

The second cross member may connect the rear ends of the pair of connecting members, and the rear ends of the pair of connecting members may be connected individually to the side members together with the end portions of the second cross member.

The vehicle body structure may be configured such that:

each of the side members is formed with a step portion which rises in a step-like fashion, in an up-to-down direction of the vehicle body, a height of portions of the side members which are situated further rearwards than the step portions in the front-to-rear direction is higher than a height of portions of the side members which are situated further forwards than the step portions in the front-to-rear direction, the first cross member is provided between the step portions of the pair of side members, and the rear ends of the connecting members are connected to the side members in positions which are situated further rearwards than the step portions in the front-to-rear direction.

The vehicle body structure may be configured such that:

the center member is a backbone which has a cross section having a tunnel-like shape which projects upwards in the up-to-down direction and which extends in the front-to-rear direction at a central portion in the widthwise direction, in the up-to-down direction, a height of the backbone is equal to the height of the portions of the side members which are situated further rearwards than the step portions in the front-to-rear direction, the connecting members extend to the front in the front-to-rear direction at a height which is equal to the height of the portions of the side members which are situated further rearwards than the step portions in the front-to-rear direction, and the front ends of the pair of connecting members are connected to a rear end of the backbone so as to face the backbone in the front-to-rear direction.

The vehicle body may be configured such that:

the second cross member is joined to halfway portions of the connecting members, end portions of the second cross member are joined to the side members respectively, and reinforcement plates are provided in spaces defined by portions of the second cross member which are situated outboards of the connecting members in the widthwise direction and portions of the connecting members which are situated from the second cross member to the rear ends of the connecting members.

DETAILED DESCRIPTION OF EXEMPLIFIED EMBODIMENTS

A vehicle body structure according to an embodiment of the invention will be described based on FIGS. 1 to 4.

Figure 1:
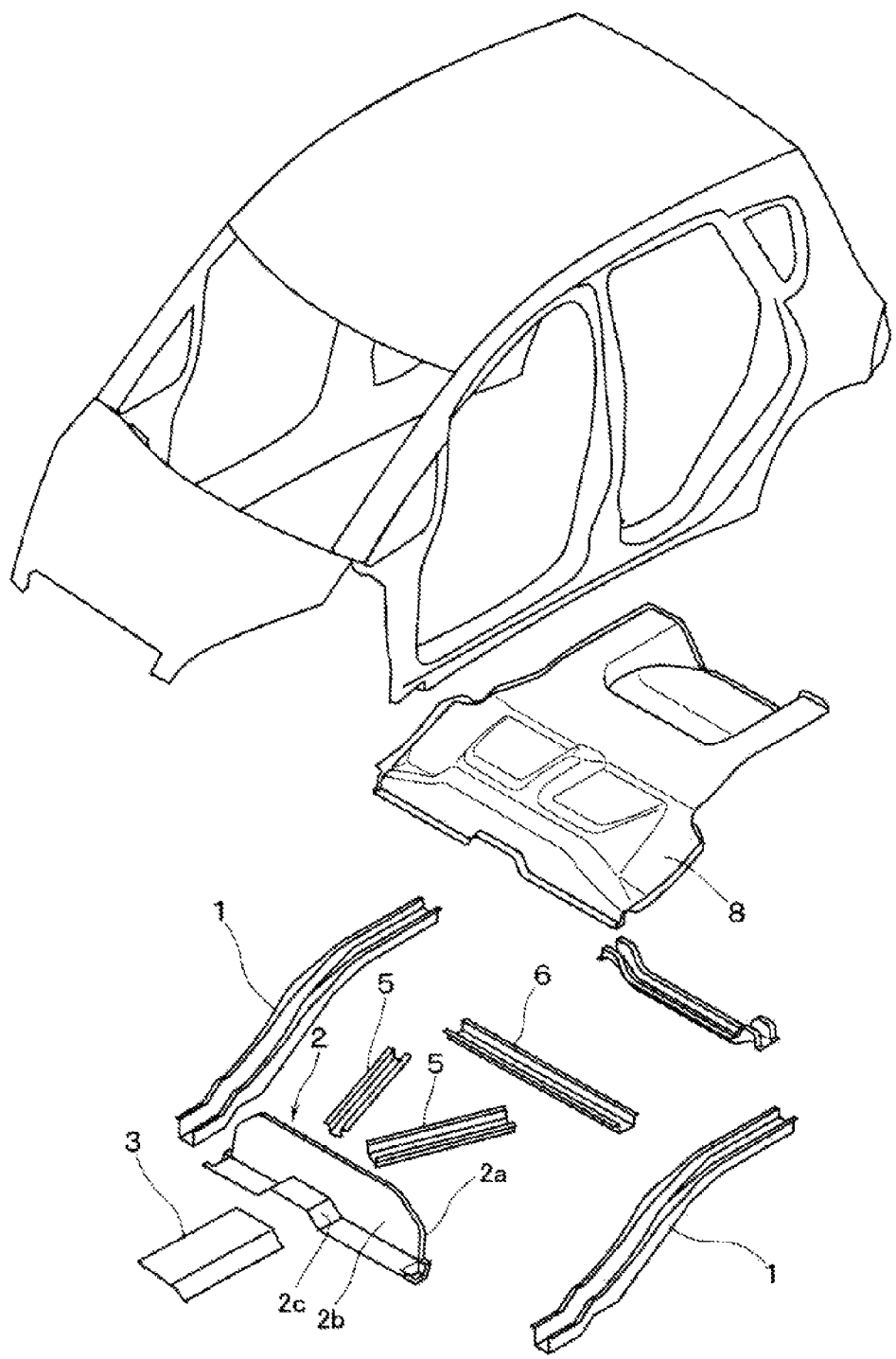
FIG. 1 is an exploded perspective view illustrating a vehicle body structure according to an embodiment of the invention.
Figure 2:
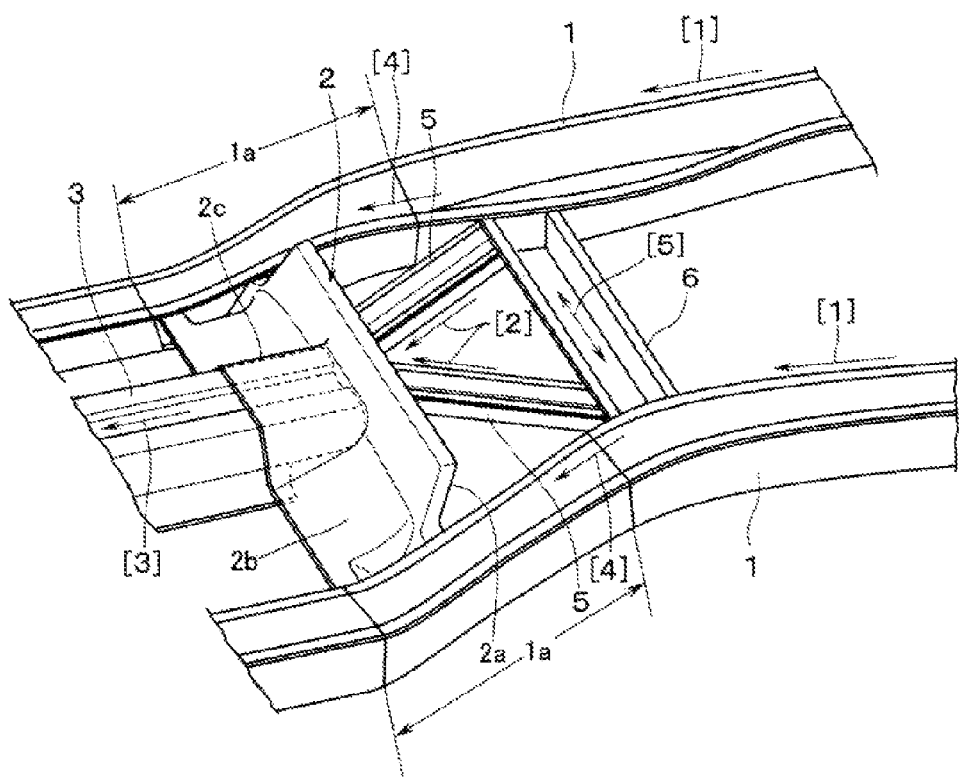
FIG. 2 is an external view of a main part of the vehicle body structure according to the embodiment of the invention.
Figure 3:
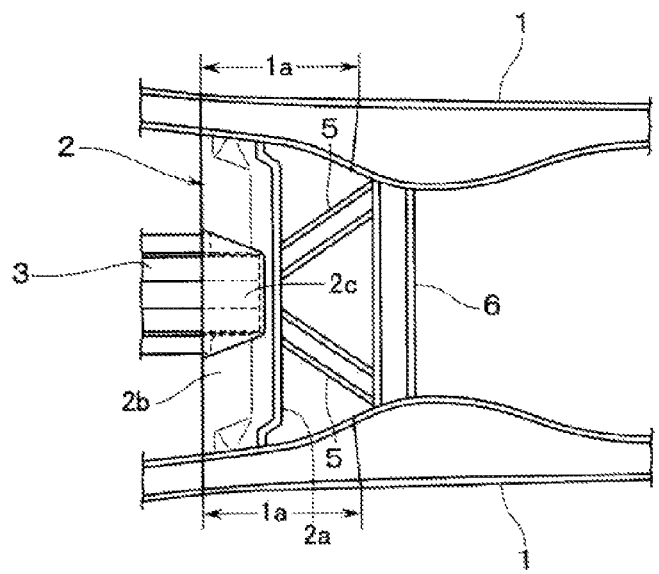
FIG. 3 is a plan view of the main part shown in FIG. 2.
Figure 4:
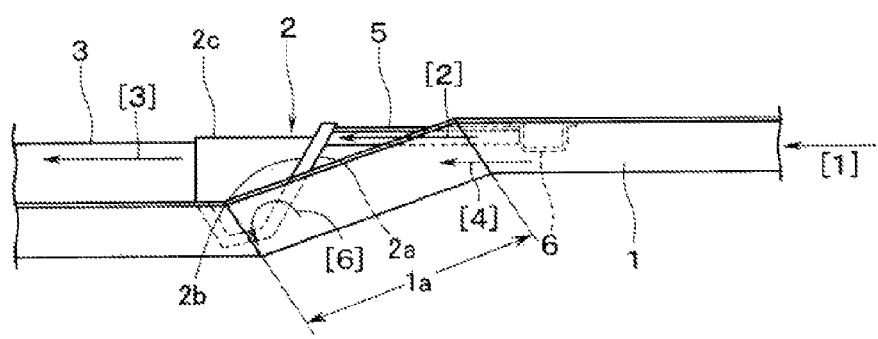
FIG. 4 is a side view of the main part shown in FIG. 2.

FIG. 1 is an exploded perspective view of constituent members of a vehicle body structure according to the embodiment of the invention, illustrating a rear structure of a vehicle to which the vehicle body structure of the embodiment is applied. FIG. 2 is a perspective view showing the structure of a main part of the vehicle body structure according to the embodiment of the invention. FIG. 3 is a plan view of the main part shown in FIG. 2. FIG. 4 is a side view of the main part shown in FIG. 2.

As shown in FIGS. 1 to 4, a pair of left and right side members 1 which extend in a front-to-rear direction of a vehicle body of a vehicle are disposed at both side portions of the vehicle body in a widthwise direction of the vehicle body. Rear portions of the side members 1 are raised in height in a step-like fashion in an up-to-down direction of the vehicle body and then extend towards the rear of the vehicle body. Namely, step portions 1a which rise in a step-like fashion are formed in the side members 1, and portions of the side members 1 which lie further rearwards than the step portions 1a are made to lie higher than portions of the side members 1 which lie further forwards than the step portions 1a.

Then, the portions lying further rearwards than the step portions 1a of the side members 1 make up a kick-up floor portion which is formed at a rear portion of a floor of the vehicle body. A rear cross member 2 is disposed at a front portion of the kick-up floor portion, that is, between the step portions 1a of the pair of side members 1, and this rear cross member 2 functions as a first cross member which extends in the widthwise direction of the vehicle body to connect the pair of side members 1 each other. Both end portions of the rear cross member 2 are joined to the pair of corresponding side members.

A backbone 3, which acts as a center member which extends in the front-to-rear direction of the vehicle body, is disposed at a front side of a longitudinal (the widthwise direction of the vehicle body) center portion of the rear cross member 2, and a rear end of the backbone 3 is joined to the rear cross member 2.

As shown in FIGS. 2 and 4, the step portions 1a of the side members 1 extend towards the rear of the vehicle body while being inclined obliquely upwards, and both end portions of the rear cross member 2 are joined to front sides (lower sides) of the step portions 1a, that is, portions of the side members 1 which lie near portions (bent portion) where the side members 1 are bent upwards at the step portions 1a for connection thereto.

The rear cross member 2 includes a vertical wall portion 2a and a lower wall portion 2b. The vertical wall portion 2a extends to a height which is substantially as high as the kick-up floor portion, that is, upper ends (rear ends) of the step portions 1a, and the lower wall portion 2b extends to the front from a lower portion of the vertical wall portion 2a. A hat portion 2c which projects upwards is formed at a longitudinal (the widthwise direction of the vehicle body) center portion of the lower wall portion 2b, and a rear end of the backbone 3 is inserted underneath a lower surface of the hat portion 2c to be joined to the rear cross member 2.

The backbone 3 is a tunnel-shaped member having an upwardly projecting cross section and extends in the front-to-rear direction of the vehicle body at the central portion in the widthwise direction of the vehicle body so as to form a floor tunnel. The backbone 3 projects to a height which is as high as an upper surface of the kick-up floor portion, that is, rear ends of the step portions 1a of the side members 1.

As shown in FIGS. 1 to 4, a rear floor cross member 6 is disposed behind the rear cross member 2 as a second cross member which extends in the widthwise direction of the vehicle body, and end portions of the rear floor cross member 6 are joined to the pair of corresponding side members 1.

A pair of left and right connecting members 5 are disposed at a rear side of the rear cross member 2 so as to extend in the front-to-rear direction of the vehicle body. Front ends of the pair of connecting members 5 are connected to a portion of the rear cross member 2 which lies near the longitudinal center portion thereof. Specifically, the front ends of the pair of connecting members 5 are connected to an upper portion 2a of the vertical wall portion 2a in a position which corresponds to the hat portion 2c to which the backbone 3 is connected to the rear cross member 2. Then, the front ends of the pair of connecting members 5 are connected the rear cross member 2 so as to correspond to the rear end of the backbone 3 in the front-to-rear direction of the vehicle body.

On the other hand, rear end portions of the pair of connecting members 5 extend outwards in the widthwise direction of the vehicle body to be connected to the side members 1 together with both end portions of the rear floor cross member 6 in positions which lie further rearwards than the step portions 1a. Specifically, rear ends of the connecting members 5 are joined to the portions of the side members 1 where the end portions of the rear floor cross member 6 are joined.

Namely, the pair of side members 5 are disposed so as to be inclined inwards in the widthwise direction of the vehicle body from the side members 1 towards the backbone 3, and the rear floor cross member 6 is disposed between the rear ends of the pair of connecting members 5 so as to connect the rear ends of the pair of connecting members 5 together.

As a result of this, triangular shapes are formed at a rear side of the rear cross member 2 by the pair of connecting members 5 and the rear floor cross member 6.

Although the front ends of the pair of connecting members 5 are described as being connected directly to the rear side of the vertical wall portion 2a of the rear cross member 2, a configuration can be adopted in which the front ends of the pair of connecting members 5 or the rear end of the backbone 3 is caused to penetrate through the vertical wall portion 2a of the rear cross member 2 so that the front ends of the pair of connecting members 5 and the rear end of the backbone 3 are joined directly to each other.

Additionally, a configuration can also be adopted in which a connecting member is attached to the rear side of the vertical wall portion 2a of the rear cross member 2 so that the front ends of the pair of connecting members 5 are joined to the connecting member.

As shown in FIG. 1, a rear floor pan 8 is provided on upper surfaces of the pair of side members 1, the rear cross member 2, the rear floor cross member 6 and the pair of connecting member 5, whereby the kick-up floor portion is made up. A rear seat or the like is placed at the kick-up floor portion so as to form a space where to accommodate rear seat passengers.

In the vehicle body structure described above, for example, when loadings are inputted into the side members 1 from the rear when the vehicle is involved in a rear collision, the loadings are transmitted to the connecting members 5 from the connecting portions with the side members 1 and are then transmitted from the front ends of the connecting members 5 to the backbone 3.

As this occurs, although loadings directed to the outside of the vehicle act on the rear ends of the connecting members 5, the loadings can be received by the rear floor cross member 6 which connects the pair of connecting members 5 together.

Namely, not only can the loadings acting on the side members 1 be transmitted to the backbone 3 via the connecting members 5 but also part of the loadings can be received by the rear floor cross member 6 as a tensile loading.

Because of this, the forward loadings acting on the side members 1 are dispersed in different directions to be received by the connecting portion of the side members 1 with the connecting members 5 and the rear floor cross member 6 so as to be transmitted to the backbone 3 in an ensured fashion, thereby making it possible to reduce the forward loadings acting on the side members 1.

Consequently, the increase in weight of the structure can be restricted to a smallest level without enhancing the rigidity of the material of the side members 1 or adding a reinforcement member thereto, and the loadings from the rear can be dispersed accurately to the front of the vehicle body.

Additionally, although the loadings acting on the side members 1 from the rear act as bending moments at the step portions 1a of the front portion of the kick-up floor portion, the loadings from the rear are transmitted to the backbone 3 via the connecting members 5 while being dispersed and are also dispersed to the rear floor cross member 6. Thus, since the loadings acting on the side members 1 from the rear can be reduced in the way described above, the bending moments can be reduced.

Further, since the height of the vertical wall portion 2a of the rear cross member 2 and the height of the backbone 3 are set almost the same as that of the kick-up floor portion, that is, those of the portions of the side members 1 which lie further rearwards than the step portions 1a and the connecting members 5 are caused to extend substantially horizontally to be connected to the backbone 3 which lies ahead of them, the loadings that are dispersed via the connecting members 5 can be transmitted to the backbone 3 as axial loadings, thereby making it possible to reduce more the bending moments in the step portions 1a.

This can restrict the occurrence of deformation in the step portions 1a of the side members 1 when the vehicle is involved in a rear collision, thereby making it possible to restrict the kick-up floor portion from being lifted up (a rear seat from being lifted up).

How loadings are dispersed when they are inputted into the vehicle body structure configured as described above from the rear will be described specifically based on FIG. 5 (FIGS. 2 and 4).

Figure 5:
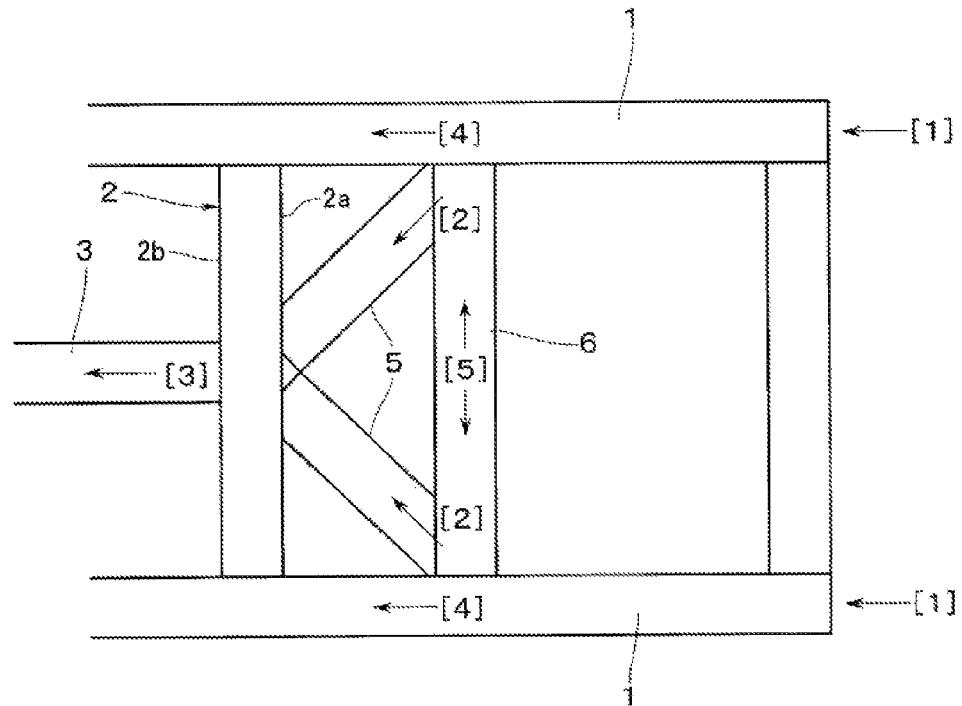
FIG. 5 is a conceptual diagram illustrating the input of loadings to the vehicle body structure according to the embodiment of the invention.

FIG. 5 shows a concept illustrating how loadings are inputted into the vehicle body structure described above.

When loadings are inputted from the rear (arrows), the loadings are transmitted to the connecting members 5 (arrows) from the portions where the connecting members 5 are connected to the side members 1 and are then transmitted to the backbone 3 from the front ends of the connecting members 5 (arrows). At the same time, the loadings which are reduced after being dispersed are transmitted to the front of the side members 1 (arrows).

Namely, the loadings (the arrows) from the rear are dispersed into the loadings which are transmitted to the backbone 3 in the direction of the arrow and the loadings which are transmitted to the front of the side members 1 in the direction of the arrows.

Further, loadings which are directed outwards in the widthwise direction of the vehicle body act on the rear ends of the connecting members 5 and a tensile loading (arrows) is generated in the rear floor cross member 6. Then, the displacement of the rear ends of the connecting members 5 is restricted as a result of the tensile loading acting outwards in the widthwise direction of the vehicle body being received by the rear floor cross member 6 in the positions where the connecting members 5 are connected to the side members 1.

Namely, part of the loadings (the arrows) acting on the side members 1 can be changed into the tensile loading (the arrows) acting in an axial direction of the rear floor cross member 6 to be absorbed by connecting the rear ends of the connecting members 5 each other by the rear floor cross member 6.

In this way, the stable structure is formed by forming the triangles by the connecting members 5 and the rear floor cross member 6.

Further, as shown in FIG. 4, since the backbone 3 is set almost as high as the kick-up floor portion and the connecting members 5 are extended substantially horizontally to be connected to the backbone 3, the loadings (an arrow) which are dispersed from the connecting members 5 to the backbone 3 can be transmitted to the backbone 3 as the axial loading. Therefore, only the loadings (an arrow) which are transmitted to the front of the side members 1 generate the bending moments in the step portions 1a, whereby loadings (an arrow) applied by the bending moments are limited.

As has been described heretofore, in the vehicle body structure of the invention, the loadings which are inputted into the side members 1 from the rear can be dispersed to the front of the side members 1 and the backbone 3. Additionally, the loadings which are inputted into the side members 1 from the rear can be changed into the tensile loading in the rear floor cross member 6 to be absorbed.

Consequently, the loadings inputted into the side members 1 from the rear can accurately be dispersed without enhancing the rigidity of the material of the side members 1 or increasing the weight of the structure by adding reinforcement members, whereby the deformation at the side members 1 or particularly at the step portions 1a can be restricted. Consequently, the kick-up floor portion is restricted from being deformed, whereby not only can the passenger accommodating space be secured, but also the component such as the fuel tank which is placed underneath the kick-up floor portion can be protected.

Other embodiments will be described based on FIGS. 6 and 7.

Figure 6:
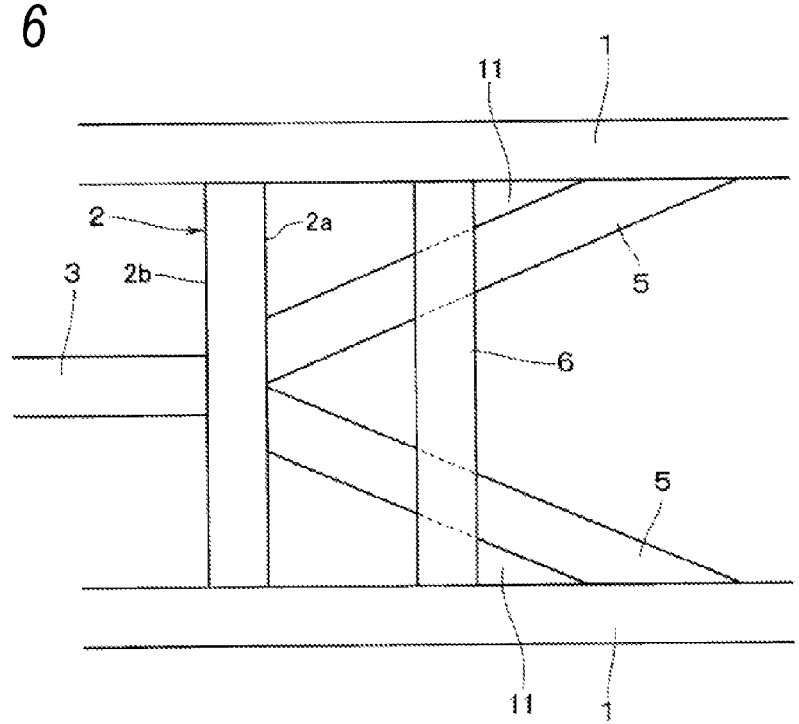
FIG. 6 is a schematic diagram of a vehicle body structure according to another embodiment of the invention.
Figure 7:
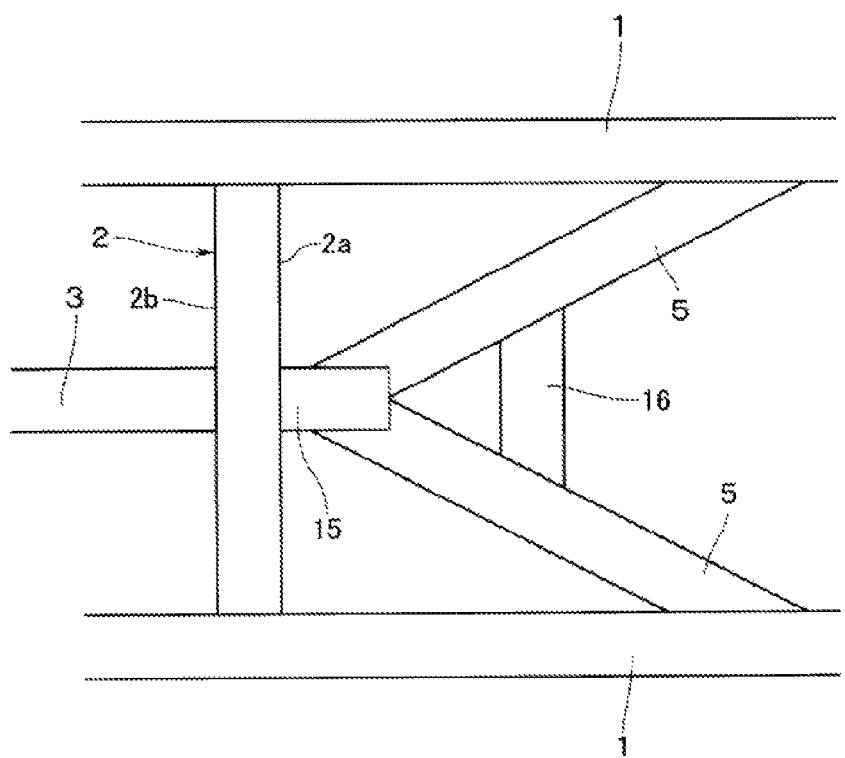
FIG. 7 is a schematic diagram of a vehicle body structure according to a further embodiment of the invention.

FIGS. 6 and 7 are schematic plan views of vehicle body structures according to other embodiments of the invention. Like reference numerals will be given to like members to those shown in FIGS. 1 to 5.

In a vehicle body structure shown in FIG. 6, connecting portions of side members 1 with a rear floor cross member 6 are situated further forwards than connecting portions of the side members 1 with rear ends of connecting members 5. Namely, the rear floor cross member 6 is joined to halfway portions of the pair of connecting members 5, and both ends of the rear floor cross member 6 are joined to the corresponding side members 1.

Then, reinforcement plates 11 are provided in spaces which are defined by portions of the rear floor cross member 6 which are situated outboards of the connecting members 5 and portions of the connecting members 5 which are situated between the rear floor cross member 6 to the rear ends of the connecting members 5. This enables the triangular structure to be maintained strongly and rigidly by the pair of connecting members 5 and the rear floor cross member 6, thereby making it possible to disperse accurately loadings inputted in to the side members 1 from the rear.

It is also possible to omit the reinforcement plates 11.

In a vehicle body structure shown in FIG. 7, a connecting member 15 is attached to a rear side of a vertical wall portion 2a of a rear cross member 2 which corresponds to a connecting portion of a backbone 3, and a pair of connecting members 5 are joined to the connecting member 15. Then, both ends of a connecting cross member 16 are joined to halfway portions of the connecting members 5.

Loadings applied to side members 1 from the rear are dispersed from the connecting members 5 to the backbone 3 via the connecting member 15, and a tensile force is generated in the connecting cross member 16 to be absorbed.

In the invention, the loadings applied to the side members from the rear are transmitted to the two connecting members and are then transmitted from front ends of the two connecting members to the center member to be dispersed. Then, the loadings which are directed outwards of the vehicle are applied to the rear ends of the two connecting members, a tensile force acts in the second cross member and the loadings applied to the side members from the rear are dispersed as the tensile force in the second cross member.

As a result of this, the increase in weight of the structure is restricted to the smallest level without enhancing the rigidity of the material of the side members or adding reinforcement members, and the loadings from the rear can accurately be dispersed.

In the invention, since both the end portions of the second cross member are joined to the corresponding side members, the tensile force acting on the second cross member can be received by the side members.

In the invention, since the loadings which are inputted into the side members from the rear can be divided into the connecting members in the positions which are situated further rearwards than the step portions, the loadings to be inputted into the step portions are reduced, thereby making it possible to restrict the generation of bending moments in the step portions where stress is easy to be collected in an ensured fashion.

In the invention, since the loadings which are dispersed to the connecting members can be transmitted to the backbone lying ahead as the axial loading, the generation of bending moments in the step portions can be restricted further.

Thus, as has been described heretofore, with the vehicle body structure of the invention, the increase in weight of the structure can be restricted to the smallest level without enhancing the rigidity of the material of the side members or adding reinforcement members, and the loadings from the rear can accurately be dispersed.

What is claimed is:

1. A vehicle body structure comprising:
   a pair of side members which are disposed at side portions of a vehicle body and extend in a front-to-rear direction of the vehicle body;
   a first cross member which extends in a widthwise direction of the vehicle body and connects the pair of side members each other;
   a center member which extends from a central portion of the first cross member in the widthwise direction to the front in the front-to-rear direction;
   a pair of connecting members which extend in the front-to-rear direction at a rear side of the first cross member in the front-to-rear direction, which are connected to the center member at front ends thereof and of which rear ends extend outwards in the widthwise direction towards the side members and are connected to the side members; and
   a second cross member which extends in the widthwise direction at the rear side of the first cross member in the front-to-rear direction and connects the pair of connecting members each other,
   wherein each of the side members is formed with a step portion which rises in a step-like fashion,
   in an up-to-down direction of the vehicle body, a height of portions of the side members which are situated further rearwards than the step portions in the front-to-rear direction and is higher than a height of portions of the side members which are situated further forwards than the step portions in the front-to-rear direction,
   the first cross member is provided between the step portions of the pair of side members, and
   the rear ends of the connecting members are connected to the side members in positions which are situated further rearwards than the step portions in the front-to-rear direction.

2. The vehicle body structure according to claim 1, wherein
   both end portions of the second cross member are connected individually to the side members.

3. The vehicle body structure according to claim 2, wherein
   the second cross member connects the rear ends of the pair of connecting members, and
   the rear ends of the pair of connecting members are connected individually to the side members together with the end portions of the second cross member.

4. The vehicle body structure according to claim 1, wherein
   the center member is a backbone which has a cross section having a tunnel-like shape which has two side walk that extend peripherally from a middle section so as to form an upward projecting cross section which projects upwards in the up-to-down direction and which extends in the front-to-rear direction at a central portion in the widthwise direction, in the up-to-down direction, a height of the backbone is equal to the height of the portions of the side members which are situated further rearwards than the step portions in the front-to-rear direction, the connecting members extend to the front in the front-to-rear direction at a height which is equal to the height of the portions of the side members which are situated further rearwards than the step portions in the front-to-rear direction, and the front ends of the pair of connecting members are connected to a rear end of the backbone so as to face the backbone in the front-to-rear direction.

5. A vehicle body structure comprising:

a pair of side members which are disposed at side portions of a vehicle body and extend in a front-to-rear direction of the vehicle body;

a first cross member which extends in a widthwise direction of the vehicle body and connects the pair of side members each other;

a center member which extends from a central portion of the first cross member in the widthwise direction to the front in the front-to-rear direction;

a pair of connecting members which extend in the front-to-rear direction at a rear side of the first cross member in the front-to-rear direction, which are connected to the center member at front ends thereof and of which rear ends extend outwards in the widthwise direction towards the side members and are connected to the side members; and a second cross member which extends in the widthwise direction at the rear side of the first cross member in the front-to-rear direction and connects the pair of connecting members each other, wherein the second cross member is joined to halfway portions of the connecting members, end portions of the second cross member are joined to the side members respectively, and reinforcement plates are provided in spaces defined by portions of the second cross member which are situated outboards of the connecting members in the widthwise direction and portions of the connecting members which are situated from the second cross member to the rear ends of the connecting members.

* * * * *